United States Patent [19]

Delorme et al.

[11] Patent Number: 5,775,593
[45] Date of Patent: Jul. 7, 1998

[54] AUTOMATIC LAWN TREATMENT DISPENSING UNIT

[76] Inventors: Virgil A. Delorme, 23615 1/2 Hillview Rd., San Bernardino, Calif. 92404; Thomas Crisofulli, 13066 Balboa La., Moreno Valley, Calif. 92553; Madelyn Joy Warner, 3908 Oakwood Pl., Riverside, Calif. 92506

[21] Appl. No.: 715,070

[22] Filed: Sep. 19, 1996

[51] Int. Cl.$^6$ ........................................... B05B 7/30
[52] U.S. Cl. ................................. 239/310; 239/318
[58] Field of Search ........................... 239/310, 318; 222/630

[56] References Cited

U.S. PATENT DOCUMENTS

| | | | |
|---|---|---|---|
| 3,003,521 | 10/1961 | Colonna | 239/318 X |
| 3,029,837 | 4/1962 | Neudeck | 239/318 X |
| 4,340,078 | 7/1982 | Pasley | 239/310 X |
| 4,340,179 | 7/1982 | Knapp | 239/310 |
| 5,259,409 | 11/1993 | Cervola | 137/268 |
| 5,303,729 | 4/1994 | DeMarco | 239/318 X |
| 5,366,159 | 11/1994 | Childers | 239/310 |
| 5,441,073 | 8/1995 | Hoadley | 239/310 X |
| 5,699,827 | 12/1997 | Delorme et al. | 239/310 X |

*Primary Examiner*—Andres Kashnikow
*Assistant Examiner*—Robin O. Evans
*Attorney, Agent, or Firm*—Michael I. Kroll

[57] ABSTRACT

An automatic lawn treatment dispensing unit (10) for a main water supply assembly (12) comprising a container (14) for holding a liquefied substance, such as a fertilizer or pesticide therein. A structure (16) is for coupling a lower end of the container (14) into the main water supply assembly (12). A facility (18) is provided for filling the liquefied substance into the container (14) through an upper end thereof. An assemblage (20) is for siphoning the liquefied substance out of the container (14), through the coupling structure (16) and into the main water supply assembly (12) to be dispersed onto a lawn (22).

20 Claims, 4 Drawing Sheets

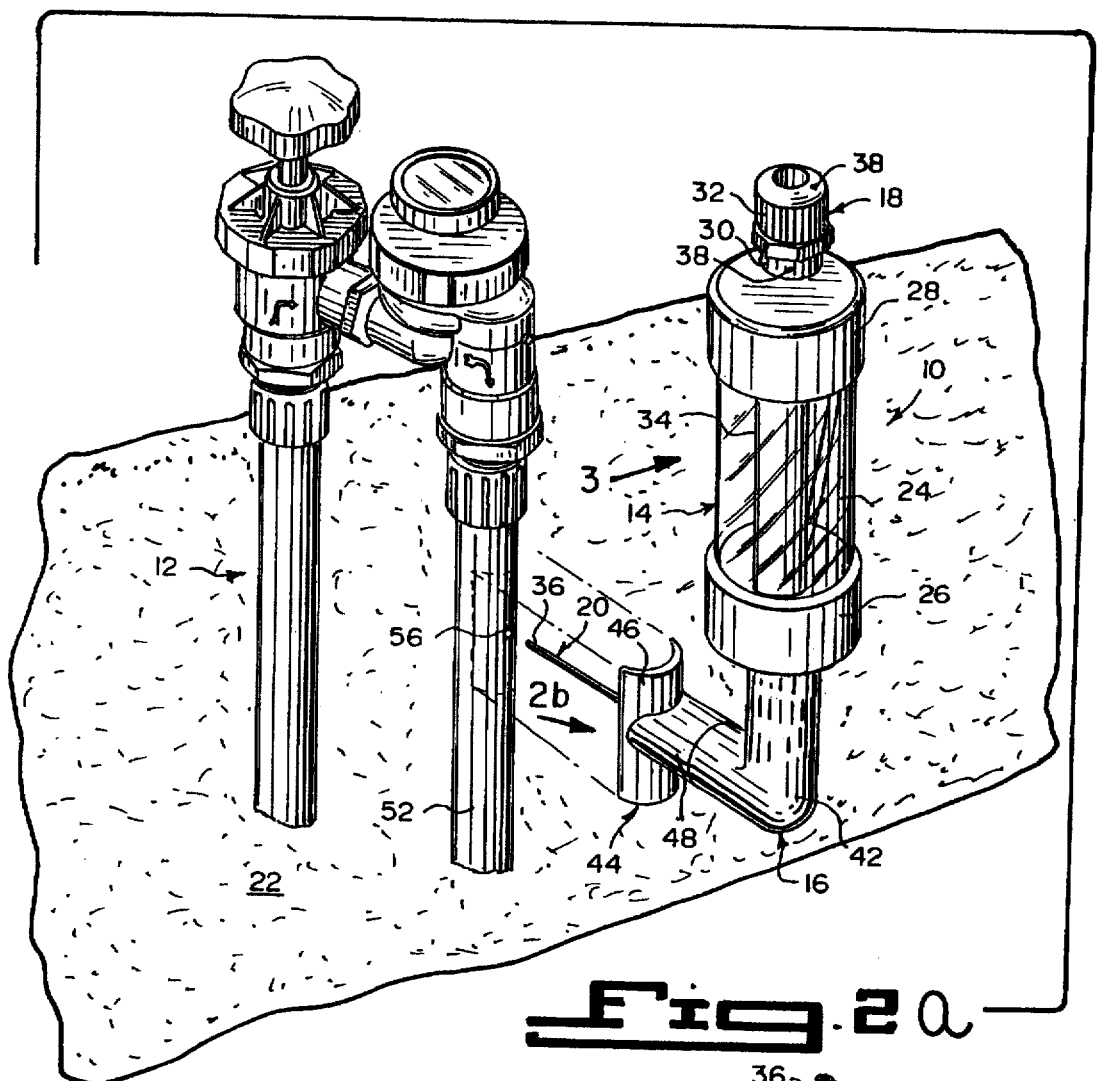
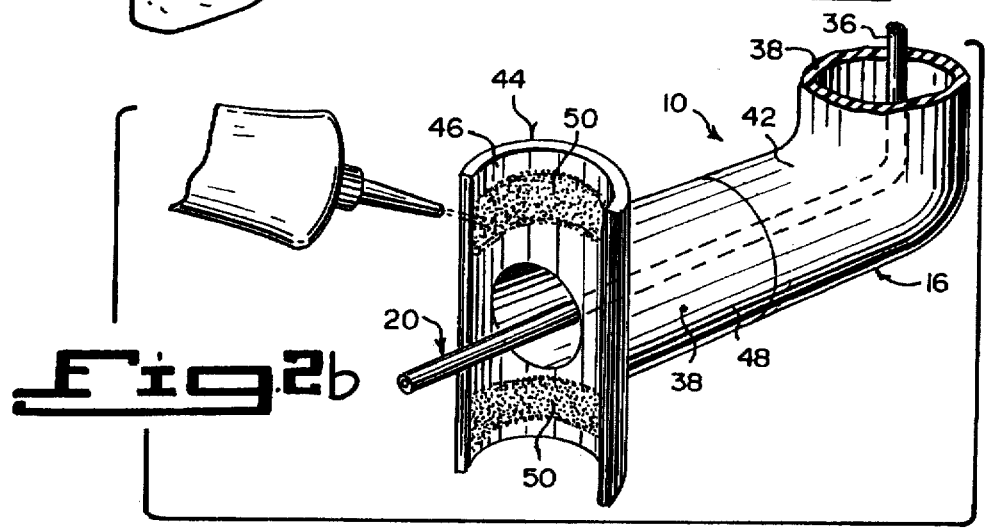

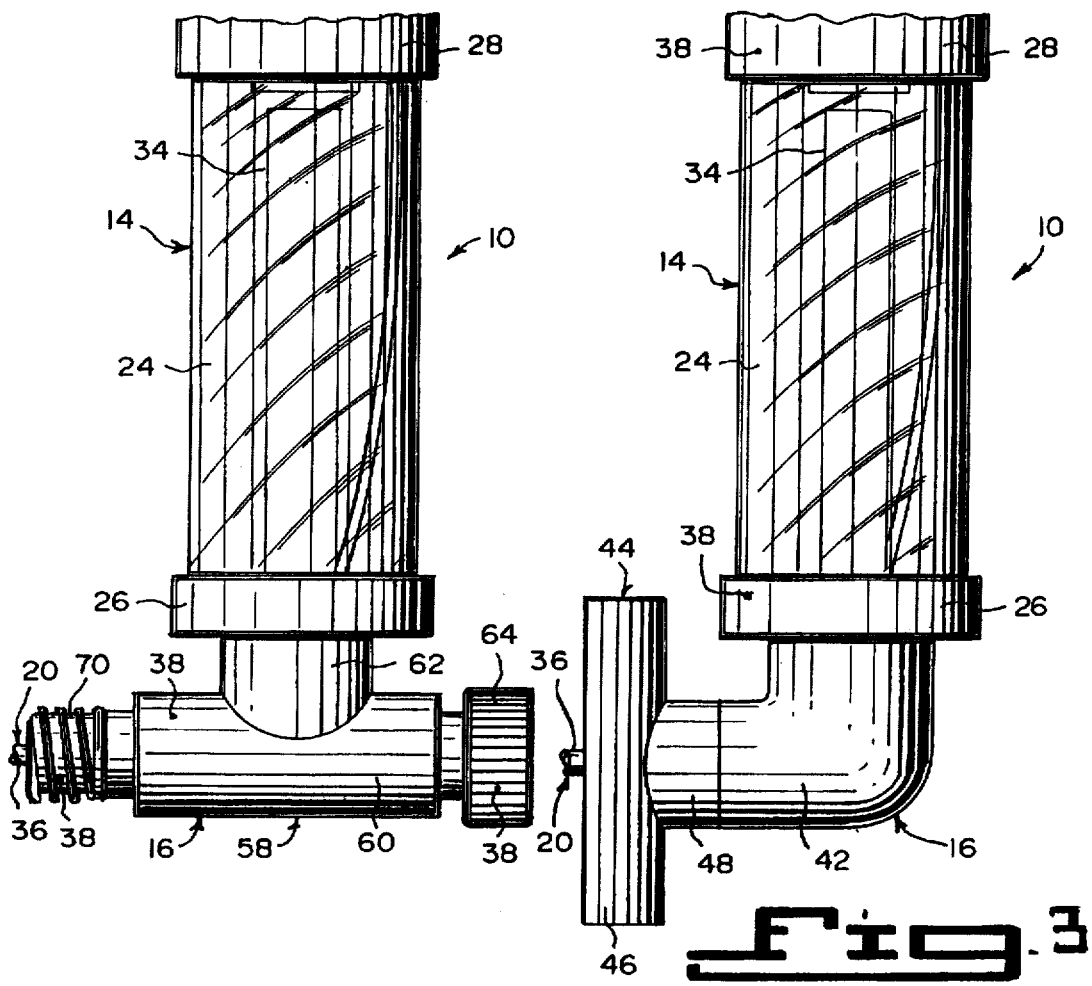
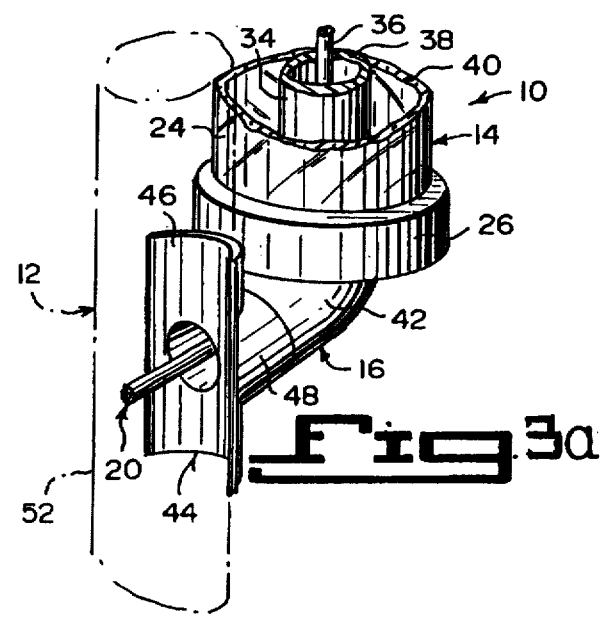

AUTOMATIC LAWN TREATMENT DISPENSING UNIT

BACKGROUND OF THE INVENTION

1. Field of the Invention

The instant invention relates generally to chemical dispersing devices and more specifically it relates to an automatic lawn treatment dispersing unit.

2. Description of the Prior Art

Numerous chemical dispersing devices have been provided in prior art. For example, U.S. Pat. Nos. 5,259,409 to Cervola; 5,303,729 to DeMarco; 5,366,159 to Childers and 5,441,073 to Hoadley all are illustrative of such prior art. While these units may be suitable for the particular purpose to which they address, they would not be as suitable for the purposes of the present invention as heretofore described.

CERVOLA, WILLIAM F.

FERTILIZER MIXING CHAMBER

U.S. Pat. No. 5,259,409

A chamber including a connector for mixing water and any of a variety of dehydrated plant chemicals such as fertilizer or insecticide. The mixing chamber is attached to an existing anti-siphon valve assembly by a connector. The connector attaches the chamber to the anti-siphon valve assembly and has a number of water entry and exit ports which pass through the connector and permit water to enter the chamber from the anti-siphon valve assembly. This permits water to effectively mix with the dry chemicals and then have the water-chemical solution forced from the chamber and applied to vegetation by a sprinkler system. The anti-siphon valve prohibits the water-chemical solution from contaminating the central water supply. The connector is an improvement over previous devices as the number of entry and exit ports have been increased, and also the configuration of the ports may be varied.

DeMARCO, PETER

LAWN CARE CHEMICAL DELIVERY DEVICE

U.S. Pat. No. 5,303,729

An automatic fertilizing device for introducing lawn care chemicals such as fertilizer, herbicides, insecticides and fungicides into a sprinkler system. A container has a control plate insert to divide the container into an upper and lower volume. The container and control plate are mounted to a flow head. The flow head controls the amount of chemicals drawn from the container and dispersed into the main water line. This device may also be employed in pool systems for dispersing chlorine.

CHILDERS, LANCE L.

AUTOMATIC LAWN AND GARDEN FEEDING APPARATUS

U.S. Pat. No. 5,366,159

An automatic fertilizing apparatus which injects fertilizer directly into the water stream of a sprinkler system. Each time the sprinkler system is activated, a predetermined amount of fertilizer is dispensed into the water stream. The apparatus can be controlled to dispense fertilizer only thru sprinkler lines determined by the user.

HOADLEY, FRANCIS B.

APPARATUS FOR CONTROLLED RELEASE OF AN ERODIBLE SOLID INTO A LIQUID

U.S. Pat. No. 5,441,073

A dispenser assembly provides for a hydro-injected venturi release of an erodible solid into a liquid. This dispenser assembly regulates the flow of a fluid direction and pressure through an activation chamber which contains a chemical capsule, and provides adequate levels of solution concentration. The dispenser assembly consists of a lower body member, an upper body member which contains the activation chamber, and a hydro-injector venturi assembly. The hydro-injector venturi assembly controls the rate of pressure of a fluid entering the upper body member into the activation chamber as well as the flow out of the chamber by means of a venturi plate.

SUMMARY OF THE INVENTION

A primary object of the present invention is to provide an automatic lawn treatment dispensing unit that will overcome the shortcomings of the prior art devices.

Another object is to provide an automatic lawn treatment dispensing unit that can be quickly connected to an outlet pipe of an underground sprinkler system, in which the lawn treatment can be introduced into the water supply thereof.

An additional object is to provide an automatic lawn treatment dispensing unit that can be quickly connected between an outdoor faucet and a garden hose for a lawn sprinkler, in which the lawn treatment can be introduced into the water supply thereof.

A further object is to provide an automatic lawn treatment dispensing unit that is simple and easy to use.

A still further object is to provide an automatic lawn treatment dispensing unit that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2a is an enlarged perspective view similar to FIG. 2, showing the first embodiment exploded from the outlet pipe of the underground sprinkler system.

FIG. 2b is a further enlarged perspective view taken in the direction of arrow 2b in FIG. 2a with parts broken away, showing cement applied to the quick connect tee.

FIG. 3 is an enlarged side view taken in the direction of arrow 3 in FIG. 2a with parts broken away.

FIG. 3a is an enlarged perspective view taken in the direction of arrow 3a in FIG. 2, with parts broken away and the outlet pipe in phantom.

FIG. 4a is an enlarged side view of the second embodiment taken in the direction of arrow 4a in FIG. 4 with parts broken away.

Similar reference characters denote corresponding features consistently throughout the attached drawings.

DETAILED DESCRIPTION OF THE PREFERRED EMBODIMENTS

Figure 1:
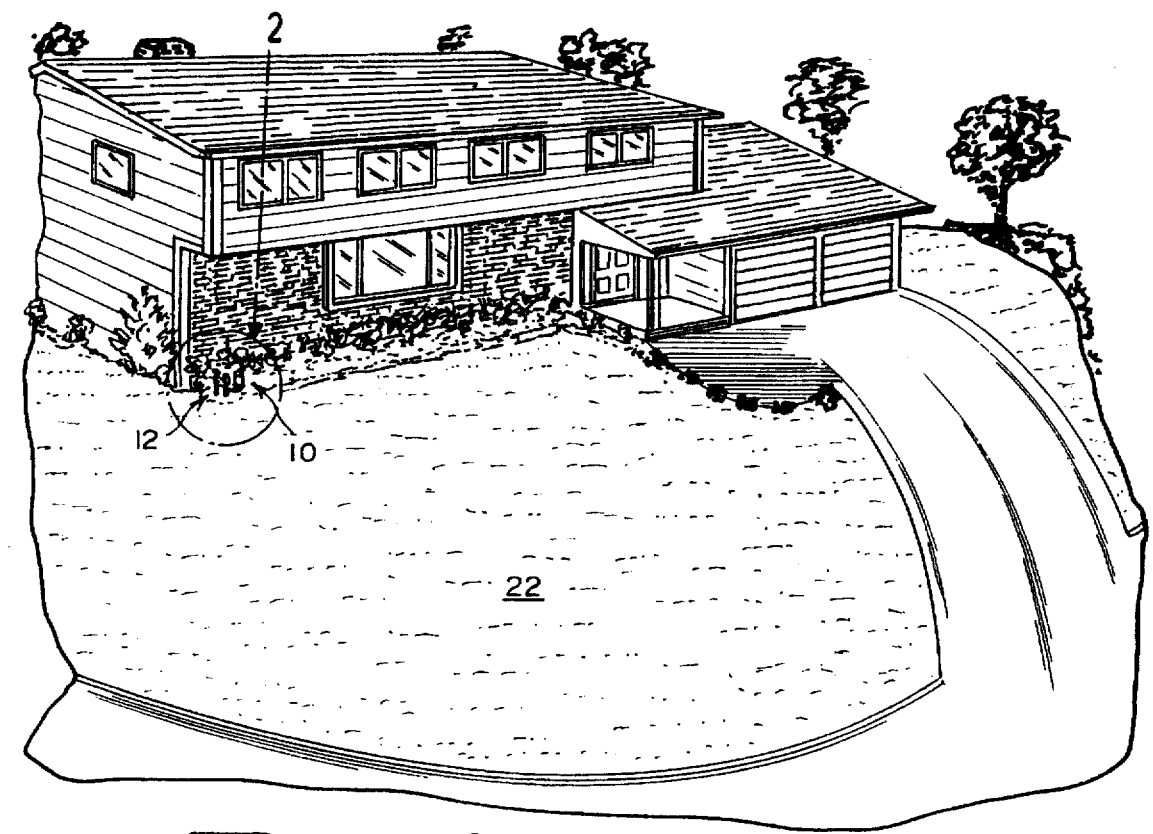
FIG. 1 is a perspective view showing a first embodiment of the instant invention installed into an underground sprinkler system on a lawn.

Turning now descriptively to the drawings, in which similar reference characters denote similar elements throughout the several views, FIGS. 1 through 4a illustrate an automatic lawn treatment dispensing unit 10 for a main water supply assembly 12, such as an underground sprinkler system comprising a container 14 for holding a liquefied substance, such as a fertilizer or pesticide. A structure 16 is for coupling a lower end of the container 14 into the main water supply assembly 12. A facility 18 is provided for filling the liquefied substance into the container 14 through an upper end thereof. An assemblage 20 is for siphoning the liquefied substance out of the container 14, through the coupling structure 16 and into the main water supply assembly 12 to be dispersed onto a lawn 22.

The container 14 includes a main body portion 24. A bottom portion 26 is affixed to the main body portion 24. A top portion 28 is affixed to the main body portion 24, so as to form a sealed chamber for the liquefied substance.

The filling facility 18 consists of an internally threaded neck 30 on the top portion 28 of the container 14, in which the liquefied substance can be poured through. A seal gasket (not shown) fits into the internally threaded neck 30. A cap 32 having an externally threaded segment (not shown) engages with the internally threaded neck 30 and contacts the seal gasket to prevent leakage therefrom.

The siphoning assemblage 20 comprises an upstanding center pipe 34 mounted through the bottom portion 26 of the container 14 to the coupling structure 16. The upstanding center pipe 34 is slightly spaced away from the top portion 28 of the container 14. An elongated flexible aspirator tube 36 extends through the coupling structure 16, up the upstanding center pipe 34, out the top portion 28 of the container 14, back in the top portion 28 of the container 14 and down to the bottom portion 26 of the container 14. When water flows through the main water supply assembly 12, the liquefied substance in the container 14 will be sucked through a first end of the elongated flexible aspirator tube 36, mixed with the water via a second end of the elongated flexible aspirator tube 36 and dispersed onto the lawn 22, through the main water supply assembly 12.

The main body portion 24, the bottom portion 26 and the top portion 28 of the container 14 are all cylindrical shaped. The bottom portion 26 and the top portion 28 of the container 14 are fabricated out of a durable plastic material 38. The main body portion 24 of the container 14 is fabricated out of a durable transparent plastic material 40, so that a person can look into the main body portion 24 and see the liquefied substance therein.

The internally threaded neck 30 and the cap 32 are fabricated out of the durable plastic material 38. The upstanding center pipe 34 is also fabricated out of the durable plastic material 38.

Figure 2:
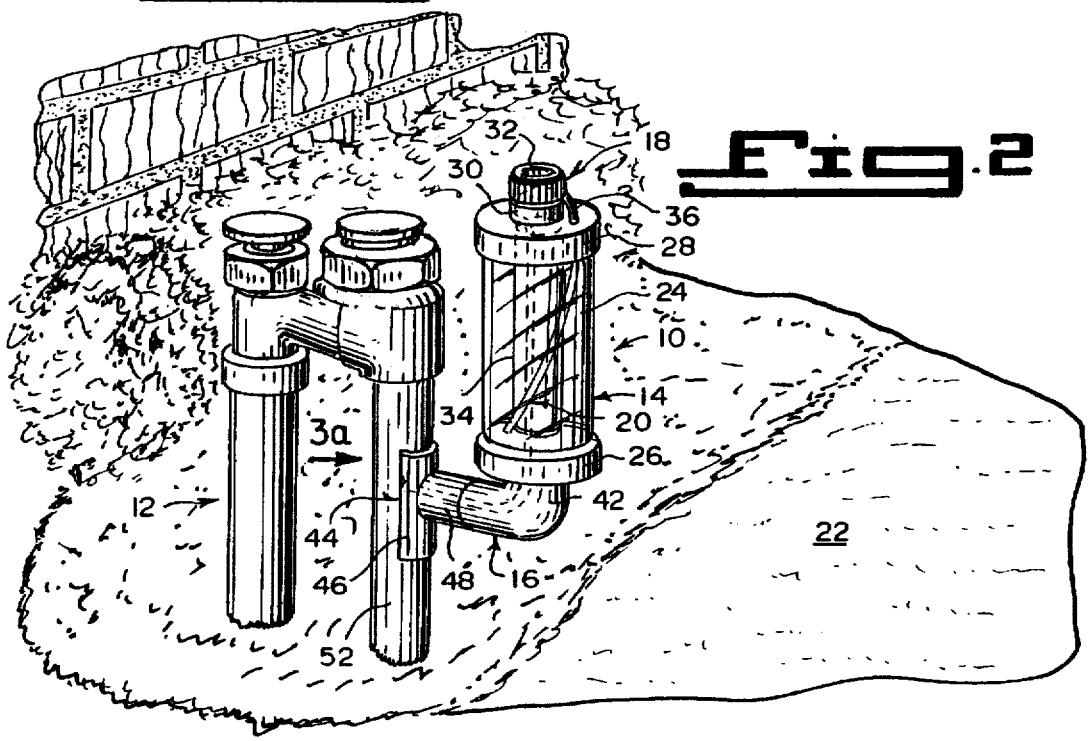
FIG. 2 is an enlarged perspective view of the area indicated by arrow 2 in FIG. 1.

The coupling structure 16, as best seen in FIGS. 2 through 3a, includes an elbow fitting 42 attached at a first end to the bottom portion 26 of the container 14. A quick connect tee fitting 44 has a semi-cylindrical segment 46 and a central right angle stub segment 48 connected to a second end of the elbow fitting 42.

A cement 50, as shown in FIG. 2b, is applied to an inner surface of the semi-cylindrical segment 46. The semi-cylindrical segment 46 can be attached to an outlet pipe 52 of an underground sprinkler system, which is the main water supply assembly 12, after the second end on the elongated flexible aspirator tube 36 extending through the elbow fitting 42 and the quick connect tee fitting 44, is inserted through a hole 56 made in the outlet pipe 52 of the underground sprinkler system (see FIG. 2a). The elbow fitting 42 and the quick connect tee fitting 44 are fabricated out of the durable plastic material 38.

Figure 4:
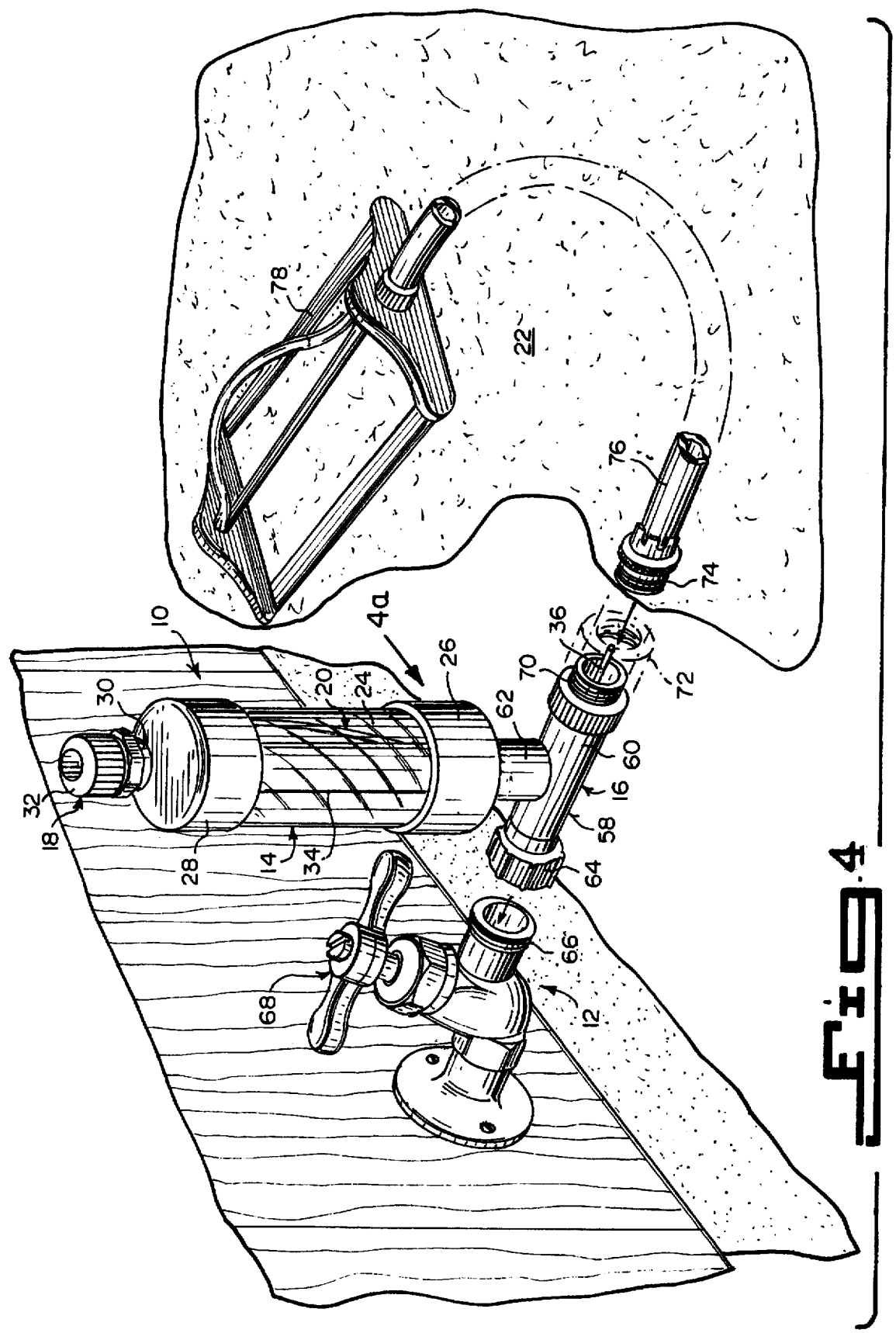
FIG. 4 is a perspective view with parts broken away, showing a second embodiment of the instant invention ready to be connected between an outdoor faucet and a house for a lawn sprinkler.

The coupling structure 16, as shown in FIGS. 4 and 4a, consists of a tee fitting 58 having a straight segment 60 and a central right angle stub segment 62 attached to the bottom portion 26 of the container 14. An internally threaded connector 64 on a first end of the straight segment 60, engages with an externally threaded spout 66 on an outdoor faucet 68, which is the main water supply assembly 12.

An externally threaded collar 70 on a second end of the straight segment 60, engages with an internally threaded coupling 72, shown in phantom in FIG. 4. The internally threaded coupling 72 is attached to an externally threaded socket 74 on a garden hose 76 that is connected to a lawn sprinkler 78, after the second end on the elongated flexible aspirator tube 38 extending through the tee fitting 58 and the externally threaded collar 70, is inserted through the internally threaded socket 74 of the garden hose 76. The tee fitting 58, the internally threaded connector 64 and the externally threaded collar 70 are fabricated out of the durable plastic material 38.

LIST OF REFERENCE NUMBERS 10 automatic lawn treatment dispensing unit
12 main water supply assembly
14 container of 10
16 coupling structure of 10
18 filling facility of 10
20 siphoning assemblage of 10
22 lawn
24 main body portion of 14
26 bottom portion of 14
28 top portion of 14
30 internally threaded neck of 18
32 cap of 18
34 upstanding center pipe of 20
36 elongated flexible aspirator tube of 20
38 durable plastic material for 26, 28, 30, 32, 34, 42, 44, 58, 64 and 70
40 durable transparent plastic material for 24
42 elbow fitting of 16
44 quick connect tee fitting of 16
46 semi-cylindrical segment of 44
48 stub segment of 44

50 cement on 46
52 outlet pipe of 54
56 hole in 52
58 tee fitting of 16
60 straight segment of 58
62 stub segment of 58
64 internally threaded connector of 16
66 externally threaded spout on 68
68 outdoor faucet for 12
70 externally threaded collar of 16
72 internally threaded coupling
74 externally threaded socket on 76
76 garden hose
78 lawn sprinkler It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. An automatic lawn treatment dispensing unit for a main water supply assembly comprising:
   a) a container for holding a liquefied substance therein, said container including;
      i) a main body portion;
      ii) a bottom portion affixed to said main body portion; and
      iii) a top portion affixed to said main body portion, so as to form a sealed chamber for the liquefied substance;
   b) means for coupling a lower end of said container into the main water supply assembly;
   c) means for filling the liquefied substance into said container through an upper end thereof; and
   d) means for siphoning the liquefied substance out of said container, through said coupling means and into the main water supply assembly to be dispersed onto a lawn, said siphoning means including:
      i) an upstanding center pipe mounted through said bottom portion of said container to said coupling means, whereby said upstanding center pipe is slightly spaced away from said top portion of said container; and
      ii) an elongated flexible aspirator tube which extends through said coupling means, up said upstanding center pipe, out said top portion of said container, back in said top portion of said container and down to said bottom portion of said container, so that when water flows through the main water supply assembly, the liquefied substance in said container will be sucked through a first end of said elongated flexible aspirator tube, mixed with the water via a second end of said elongated flexible aspirator tube and dispersed onto the lawn, through the main water supply assembly.

2. An automatic lawn treatment dispensing unit as recited in claim 1, wherein said main body portion, said bottom portion and said top portion of said container are all cylindrical shaped.

3. An automatic lawn treatment dispensing unit as recited in claim 1, wherein said filling means includes:
   a) an internally threaded neck on said top portion of said container in which the liquefied substance can be poured through;
   b) a seal gasket which fits into said internally threaded neck; and
   c) a cap having an externally threaded segment which engages with said internally threaded neck and contacts said seal gasket to prevent leakage therefrom.

4. An automatic lawn treatment dispensing unit as recited in claim 1, wherein said bottom portion and said top portion of said container are fabricated out of a durable plastic material.

5. An automatic lawn treatment dispensing unit as recited in claim 1, wherein said main body portion of said container is fabricated out of a durable transparent plastic material, so that a person can look into said main body portion and see the liquefied substance therein.

6. An automatic lawn treatment dispensing unit as recited in claim 3, wherein said main body portion, said bottom portion and said top portion of said container are all cylindrical shaped.

7. An automatic lawn treatment dispensing unit as recited in claim 6, wherein said bottom portion and said top portion of said container are fabricated out of a durable plastic material.

8. An automatic lawn treatment dispensing unit as recited in claim 3, wherein said internally threaded neck and said cap are fabricated out of a durable plastic material.

9. An automatic lawn treatment dispensing unit as recited in claim 1, wherein said upstanding center pipe is fabricated out of a durable plastic material.

10. An automatic lawn treatment dispensing unit as recited in claim 1, wherein said coupling means includes:
    a) an elbow fitting attached at a first end to said bottom portion of said container;
    b) a quick connect tee fitting having a semi-cylindrical segment and a central right angle stub segment connected to a second end of said elbow fitting; and
    c) a cement applied to said semi-cylindrical segment, so that said semi-cylindrical segment can be attached to an outlet pipe of an underground sprinkler system, which is the main water supply assembly, after said second end on said elongated flexible aspirator tube extending through said elbow fitting and said quick connect tee fitting, is inserted through a hole made in the outlet pipe of the underground sprinkler system.

11. An automatic lawn treatment dispensing unit as recited in claim 10, wherein said elbow fitting and said quick connect tee fitting are fabricated out of a durable plastic material.

12. An automatic lawn treatment dispensing unit as recited in claim 1, wherein said coupling means includes:
    a) a tee fitting having a straight segment and a central right angle stub segment attached to said bottom portion of said container;

b) an internally threaded connector on a first end of said straight segment, which engages with an externally threaded spout on an outdoor faucet, which is the main water supply assembly; and c) an externally threaded collar on a second end of said straight segment, which engages with an internally threaded coupling that is attached to an externally threaded socket on a garden hose that is connected to a lawn sprinkler, after said second end on said elongated flexible aspirator tube extending through said tee fitting and said externally threaded collar, is inserted through the internally threaded socket of the garden hose.

13. An automatic lawn treatment dispensing unit as recited in claim 12, wherein said tee fitting, said internally threaded connector and said externally threaded collar are fabricated out of a durable plastic material.

14. An automatic lawn treatment dispensing unit as recited in claim 7, wherein said main body portion of said container is fabricated out of a durable transparent plastic material, so that a person can look into said main body portion and see the liquefied substance therein.

15. An automatic lawn treatment dispensing unit as recited in claim 14, wherein said internally threaded neck and said cap are fabricated out of a durable plastic material.

16. An automatic lawn treatment dispensing unit as recited in claim 15, wherein said upstanding center pipe is fabricated out of a durable plastic material.

17. An automatic lawn treatment dispensing unit as recited in claim 16, wherein said coupling means includes:

a) an elbow fitting attached at a first end to said bottom portion of said container;

b) a quick connect tee fitting having a semi-cylindrical segment and a central right angle stub segment connected to a second end of said elbow filling; and c) a cement applied to said semi-cylindrical segment, so that said semi-cylindrical segment can be attached to an outlet pipe of an underground sprinkler system, which is the main water supply assembly, after said second end on said elongated flexible aspirator tube extending through said elbow fitting and said quick connect tee fitting, is inserted through a hole made in the outlet pipe of the underground sprinkler system.

18. An automatic lawn treatment dispensing unit as recited in claim 17, wherein said elbow fitting and said quick connect tee fitting are fabricated out of a durable plastic material.

19. An automatic lawn treatment dispensing unit as recited in claim 16, wherein said coupling means includes:

a) a tee fitting having a straight segment and a central right angle stub segment attached to said bottom portion of said container;

b) an internally threaded connector on a first end of said straight segment, which engages with an externally threaded spout on an outdoor faucet, which is the main water supply assembly; and c) an externally threaded collar on a second end of said straight segment, which engages with an internally threaded coupling that is attached to an externally threaded socket on a garden hose that is connected to a lawn sprinkler, after said second end on said elongated flexible aspirator tube extending through said tee fitting and said externally threaded collar, is inserted through the internally threaded socket of the garden hose.

20. An automatic lawn treatment dispensing unit as recited in claim 19, wherein said tee fitting, said internally threaded connector and said externally threaded collar are fabricated out of a durable plastic material.

* * * * *